Aug. 1, 1967  LE ROY M. FINGERSON  3,333,470
METHOD AND APPARATUS FOR SENSING FLUID PROPERTIES
Filed June 1, 1964  4 Sheets-Sheet 1
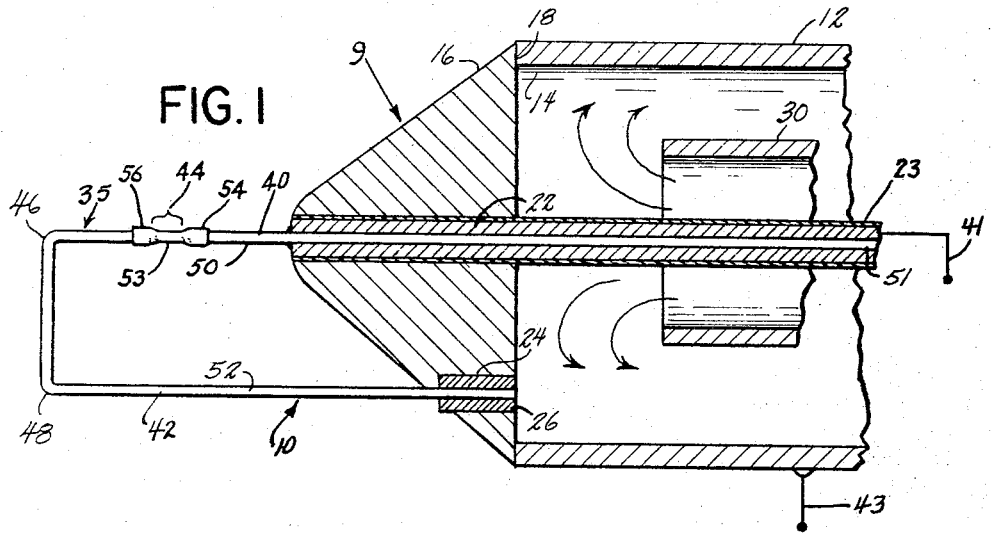
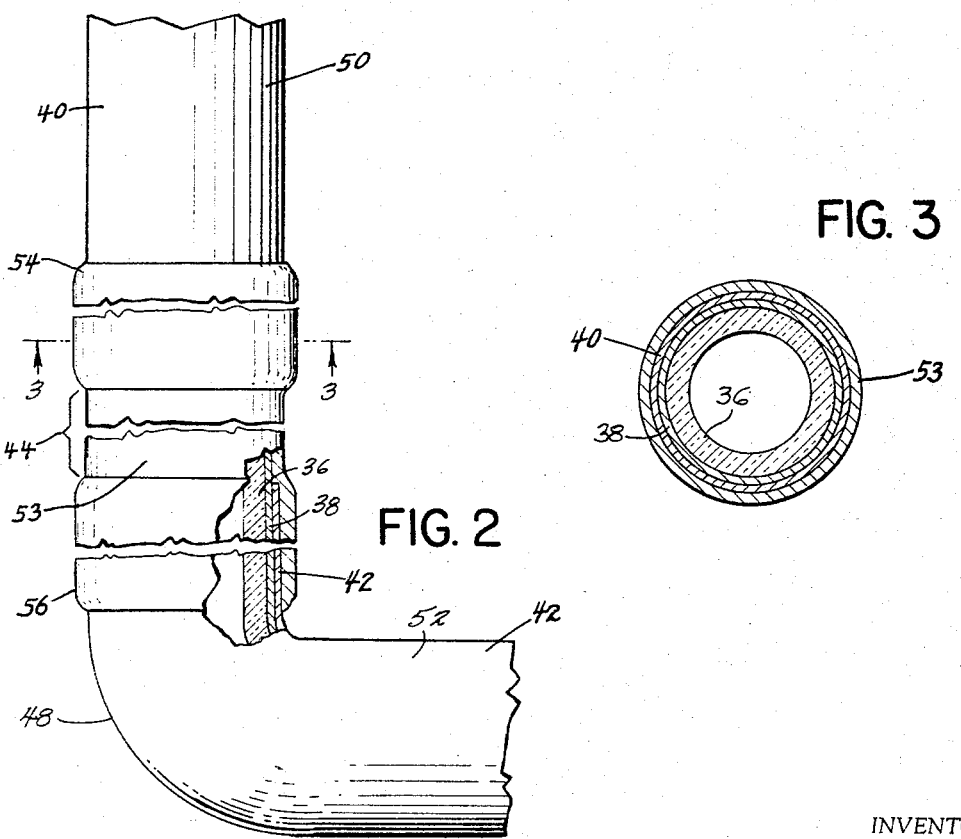
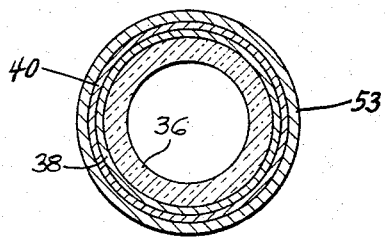
INVENTOR.
LE ROY M. FINGERSON
BY Moore, White & Bund
ATTORNEYS Aug. 1, 1967   LE ROY M. FINGERSON   3,333,470
METHOD AND APPARATUS FOR SENSING FLUID PROPERTIES
Filed June 1, 1964   4 Sheets-Sheet 2

INVENTOR.
LE ROY M. FINGERSON
BY
*Moore, White & Burd*
ATTORNEYS

United States Patent Office 3,333,470
Patented Aug. 1, 1967

3,333,470
METHOD AND APPARATUS FOR SENSING FLUID PROPERTIES
Le Roy M. Fingerson, St. Paul, Minn., assignor to Thermo-Systems, Inc., Minneapolis, Minn., a corporation of Minnesota
Filed June 1, 1964, Ser. No. 371,586
The portion of the term of the patent subsequent to June 23, 1981, has been disclaimed
17 Claims. (Cl. 73—362)

The present invention relates to measuring and testing equipment and particularly to an instrument for sensing fluid properties and to a process for using the same. While the invention has general application, it is particularly desirable in sensing fluid properties in a corrosive, deleterious or electrically conducting environment.

The present application is a continuation-in-part of my copending application entitled, High Temperature Probe, Ser. No. 43,376, filed July 18, 1960, now Patent No. 3,138,025, issued June 23, 1964. In that application, a cooled probe is described for making measurements in high temperature environments. The element of this probe which is sensitive to changes in fluid properties is an electrical conducting platinum film on the surface of an internally cooled ceramic tube. This platinum film is exposed directly to the fluid being measured. Experience with these heat flux sensors in combustors such as rockets and jet engines has shown that exposure to these environments often change the surface properties of the metal film, at least temporarily.

It has been found, for example, in making measurements in a propane-air flame that the resistance between the terminals of the probe decreases during the test procedure as though a conductive material were being deposited upon the sensing element. It was also found that this reduction in resistance across the terminals of the probe gradually disappears after removal from the test environment. The exact nature of the phenomenon is not known.

Obviously, the above described drift makes the data from cooled sensors subject to inaccuracies in various types of flames such as rocket engines, jet combustors, furnaces, etc. A procedure has had to be devised to overcome this difficulty without materially affecting time response. In addition to the particular problem, it is also desirable to be able to use the cooled film sensors in hot, ionized (electrically conducting) gases. Finally, soot and tar deposits on the exposed metallic conducting film also cause difficulties. The above problems indicate the necessity of somehow protecting the conducting metallic film without materially affecting frequency response.

It should be emphasized that problems similar to the above have existed for a long time in applications of hot-wire and hot-film sensors in low temperature environments where contamination due to dust, dirt, entrained oils, etc., has been a problem for many years. In liquid applications, particularly in water, many attempts have been made to make measurements of velocity and turbulence using hot-wire or hot-film sensors with little success. In measuring velocity or turbulence levels in water, it was found that coatings of minerals were deposited on the heat flux sensing element in sufficient quantities to interfere with accurate readings. It was also found that small bubbles of gas were formed on the surface of the conductor material from which the probe is formed. Each time such a bubble forms, a deflection will occur on the recording instruments thus interfering with the accuracy of the readings being taken.

In previous work with hot-film and hot-wire sensors, the need for exposing the sensitive element directly to the environment has been emphasized. This emphasis is natural since the quantity sensed is heat transfer between the sensor and the surrounding environment. A thermal insulator between the source of heat (electrically heated metallic film or wire) and the environment certainly seems undesirable. This is particularly true since, in general, hot-wire and hot-film type sensors are used where very fast time response is a requirement.

The present invention is most useful in sensing-instruments of the type in which the electrical resistance of a sensing element having a small mass responds to the changes in the thermodynamic properties of the environment. The response of the sensing element is sensed by connecting a current measuring or regulating means across the ends thereof. The current is then regulated to maintain the electrical resistance at a constant value. The invention is particularly desirable in making instantaneous measurements of the potential of a fluid to transfer heat to a relatively small surface (that of the sensing element) of known surface temperature.

Briefly stated, the invention includes a sensor formed from a material with a very high electrical resistivity and low thermal conductivity, such as glass or other ceramic, coated with a metallic film. A thin layer of a continuous, corrosion resistant and electrically nonconductive film is applied over the metallic film. If required, a cooling fluid is forced through the probe. An electrical current is utilized to maintain the metallic film at a constant temperature by resistance heating. Changes in the properties of the fluid medium surrounding the probe are sensed by changes in the amount of current necessary to keep the metallic film at a constant temperature. Thus, the operation of the probe of this invention involves maintaining a constant temperature on the surface of a body, such as a glass tube, which can be cooled for high temperature application. The temperature is maintained by utilizing an electrical circuit to correct temperature changes due to variations in surrounding fluid properties.

In accordance with the present invention, the sensing element is held at a constant temperature by means of a current source controlled by a bridge circuit. The current required to keep the sensing element at a constant temperature is a function of the heat transferred to the environment. While in prior practice, a particular effort was made in keeping the sensing element uncovered and exposed to the environment which is being tested to obtain satisfactory response time, I have discovered that by providing a thin continuous layer of homogeneous and electrically nonconductive ceramic material, such as quartz or high silica glass, over the sensing element, good frequency response can be obtained in constant temperature operation even though there is no direct exposure of the temperature sensing element to the environment.

The heat flux probe of this invention is useful for indicating properties of fluids maintained at a steady state and also as an instrument for measuring rapidly fluctuating properties. The probe is useful for the measurement of temperatures, velocities, concentrations and like properties of fluids. One exemplary use of the device is the measurement of high temperatures. Another exemplary use of the device is the measurement of turbulence and velocity of liquids, such as water. In the latter application, erroneous readings due to the deposition of minerals from the water or resulting from the formation of bubbles can be substantially eliminated with my invention. In addition, the insulating layer permits measurements in electrically conducting liquids, such as mercury, sodium and potassium. In dealing with rapidly fluctuating properties, frequency responses of up to 50,000 cycles per second are possible.

The heat flux probe of the present invention is characterized by a high frequency response, a small measurement area, extreme simplicity of operation and of reliability on chemically active environments. These characteristics make it adaptable for use in many varied applications. Among these may be mentioned research and testing and control of jet engines and rockets; steam boiler research, testing and operation; direct temperature determination of hot gases in open hearth furnaces and Bessemer converters; in gas cooled nuclear piles and plasma jets; and the like.

The principal object of this invention is to provide a heat flux sensing process and probe of simple operation, small measurement area and high frequency response.

A further object of this invention is to provide a probe of high electrical resistivity and low thermal conductivity having internal cooling means and outside electrical conducting means adapted to measure changes in heat flux by sensing variations in amount of electrical current necessary to maintain the conducting means at a constant temperature.

It is yet another object of the present invention to provide an improved heat sensing probe characterized by the ability to reliably sense heat flux changes after the deposition of foreign material on the surface thereof.

Another object of the present invention is the provision of an improved heat flux sensing probe wherein reliability of operation is improved by interposing a barrier between the conductive sensing material and the environment but without substantially affecting the frequency response of the instrument.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 1 is a partial longitudinal sectional view of the probe embodying the present invention;

FIGURE 2 is a partial side elevational view of the left end of the probe as seen in FIGURE 1, on a greatly enlarged scale;

FIGURE 3 is a transverse sectional view taken on line 3—3 of FIGURE 2;

Figure 4:
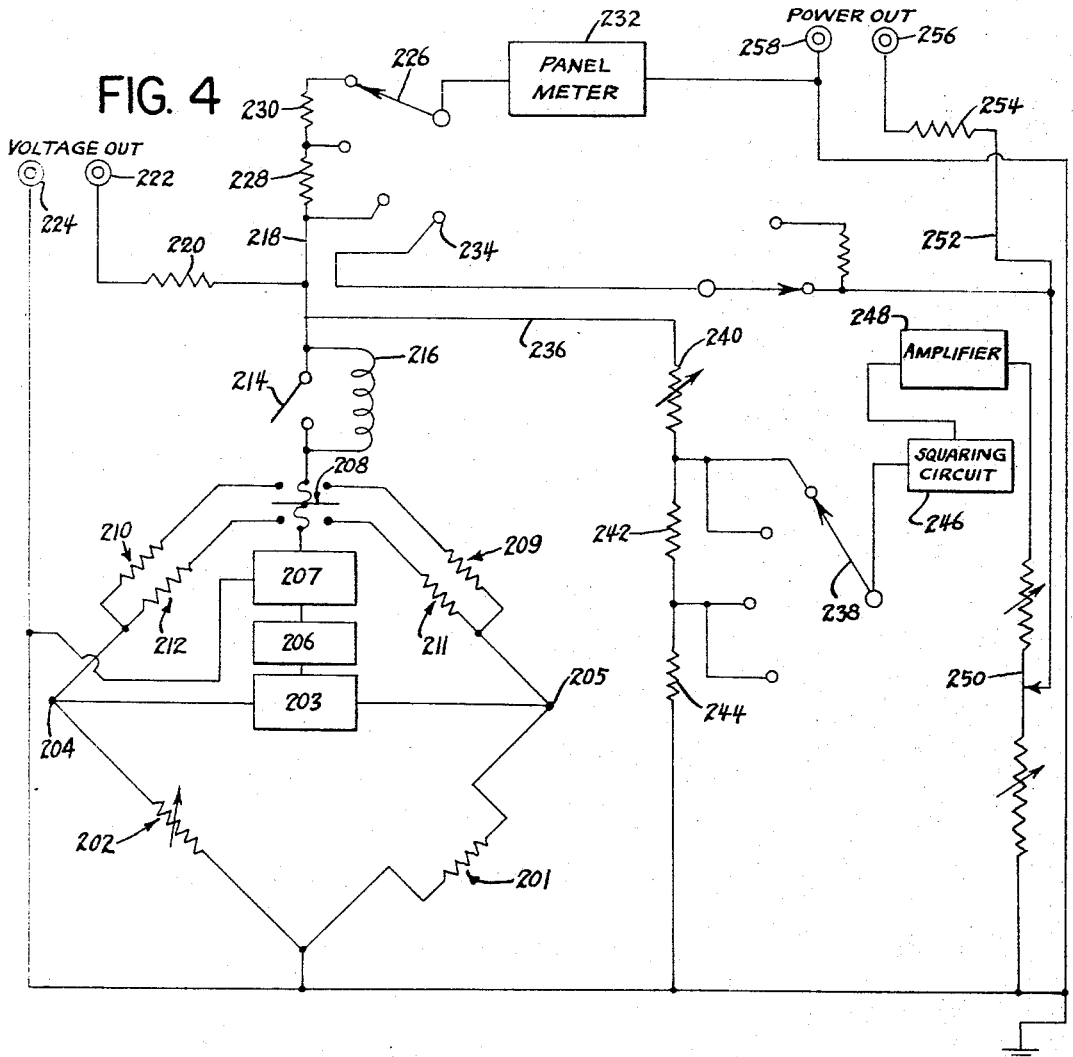
FIGURE 4 is an electrical circuit diagram of the invention.

Referring now to the drawings, there is shown a fluid properties sensing instrument 9 including a probe 10 comprising a support 12 formed from a hollow cylindrical tube 14 to which a conical tip 16 is secured, as by welding at 18. The tip 16 is bored on its center and within the bore is positioned a retainer, such as metal tube 22, which is coated with an insulating layer 23. A second bore 24 is provided in the tip 16 along an axis extending parallel to the central bore but adjacent the periphery of the probe. Within the bore 24 is provided a retainer such as metal tube 26.

If desired, the support 12 can be cooled in any suitable and well known manner as by the provision of a pipe 30 extending through the center of the tube 14 to the proximity of the tip 16 and being open at the end. A cooling medium, such as water, can be pumped through the pipe 30 into the end of the support adjacent the tip 16. The cooling medium then returns through the space between the outside walls of the tube 30 and the inside walls of the tube 14.

The sensing element of the probe, indicated generally at 35, is supported within tubes 22 and 26 and comprises an elongated supporting member or substrate, such as a quartz tube 36 (as seen in FIGURES 2 and 3). While the size of the tube can vary widely depending upon the requirements of the particular application for which the sensing element is employed, an outside diameter of from 0.001 inch to 0.010 inch and an inside diameter of from about one-half to nine-tenths the outside diameter is typical. For many purposes, a tube having an outside diameter of 0.006 inch and an inside diameter of 0.0048 inch has been found satisfactory.

On the outside surface of the tube 36 is a layer of a conductive heat flux sensing material 38. This layer is relatively thin and is preferably formed from a stable metal, such as platinum. The platinum layer 38 can be applied in a variety of ways, as by vacuum deposition or electroplating, but is preferably applied by chemical means or sputtering according to known practice. While the platinum layer can be applied in a layer of from about 500 to 5000 angstroms in thickness or even greater, a preferred thickness is from about 800 to 1200 angstroms.

After the platinum layer 38 has been applied, a coating of gold is applied at 40 and 42 leaving a gap which comprises a sensing section 44 at the approximate center of that portion of the tube 36 which projects from the tip 16. In comparison with the thickness of the conductive layer 38, the gold coating layers 40 and 42 are relatively thick as, for example, about 0.0005 inch in thickness. Conductors 41 and 43 are connected to the tube 22 and tube 14 respectively for the purpose of wiring the sensing element to a bridge circuit, as will be described hereinbelow.

In accordance with the present invention, still another protective and insulating coating layer is applied to the probe sensing element. This coating layer is designated 53. Coating layer 53 is formed from a chemically relatively inert homogeneous and corrosion resistant ceramic material, such as quartz or high silica glass, having a thickness of aobut the same order as the sensing element. The ceramic layer 53 can have a thickness of from about 4000 to 20,000 angstroms and a preferred thickness range of from about 6000 to 14,000 angstroms. As clearly shown in FIGURES 1 and 2, the ends 54 and 56 of the ceramic coating 53 overlaps the gold coating layers 40 and 42 at each end thereby completely covering and enclosing the sensing section 44. Suitable bends are made in the support 36 as at 46 and 48 to provide two parallel legs 50 and 52 which project through the emtal tubes 22 and 26. A cooling medium, such as water or the like, is supplied through the bore 51 of the tube 22 to the leg 50 and is vented from the leg 52 into tube 14. In this manner the inside of the sensing element is kept at a relatively constant temperature.

The ceramic layer 53 is preferably applied by sputtering, as described in more detail hereinbelow. The thickness of the ceramic coating on one hand should be great enough so that few if any discontinuities or openings appear in the ceramic coating. On the other hand, it should not be so thick that it provides sufficient mass to interfere with the required response time resulting from a change in the ambient temperature.

The selection of the proper material and the method of application are interrelated. In general, the only materials which have low electrical conductivity and high thermal conductivity are ceramics. Until very recently, methods of depositing these materials in thin layers have not been available. The sputtering technique has recently been developed to the point where ceramic layers can be applied in thin layers to various substrates. Quartz is a preferred material because either quartz or high silica glass (Vycor) is normally used for the substrate. Therefore, the substrate and the surface coating have similar thermal properties.

The quartz film is deposited on sensors by means of a cathode-sputtering process. In sputtering, positive ions of residual gas are accelerated towards a quartz target by means of an electrostatic field between two electrodes. As the positive ions bombard the quartz target, they dislodge quartz particles of molecular dimensions. These quartz particles are then randomly deposited on the sensors to form an extremely uniform thin insulating layer.

To maintain the metallic film on the sensor at constant temperature, a bridge and amplifier system is used as shown in FIGURE 4. The sensor is installed as one leg 201 of the resistive bridge. A variable resistor on the leg 202 opposite the sensor is used to adjust the sensor operating resistance. While the operation is explained one step at a time, it is of course understood that corrections for heat flux change are made simultaneously with the flux change.

A floating amplifier 203 is used to sense voltage differences between points 204 and 205. This voltage difference is amplified and the output fed through the stability control 206 to a power amplifier with a high impedance input 207 and a reference ground the same as that of the bridge. The output of this amplifier is then fed to the top of the bridge 208.

Two sets of resistors (209, 210 and 211, 212) are available on the legs of the bridge between the power amplifier output 208 and the input to the floating amplifier 204 and 205. One set is connected when operating in the High Power (HP) Mode and the other when operating in the High Sensitivity (HS) Mode. Which mode is used depends on the power required to operate the sensor as follows:

HP: 0 to 40 watts
HS: 0 to 1.5 watts

The signal to noise ratio on the high resistivity bridge is approximately five times better than on the high power bridge.

The feedback system works as follows. Assume first a slight decrease in amount of heat transferred from environment to sensor. This will cause the voltage at 205 to decrease with respect to that at 204. This voltage will, through amplification by 203 and 207, cause an increase in voltage at 208. This increase in voltage will then cause an increase in electrical power dissipated in the sensor at 201, thereby returning the points 204 and 205 back to approximately the balance position.

Connected to the switch 208 is a switch 214 in parallel with a filtering choke of a suitable size as a 30 kc. choke for filtering out high frequency electronic noise. To operate the choke 216 the switch 214 is opened. Connected to the choke 216 through a conductor 218 is a dropping resistance 220. The resistance 220 is coupled to a terminal 222. Between the terminal 222 and ground 224 a suitable recording or measuring instrument is connected for recording the output of the bridge circuit. For this purpose a suitable RMS meter, tape recorder or the like (not shown) can be employed. Also connected to the conductor 218 is a selector switch 226 having dropping resistors 228 and 230 between the terminals thereof for changing scales when the output is read on panel meter 232. The selector switch 226 also includes a terminal 234 which enables the panel meter 232 to be connected for reading the sensor probe power rather than sensor probe voltage.

Also connected to the line 218 is a line 236 which is coupled to the terminals of a selector switch 238 through a variable dropping resistor 240. A dropping resistor such as the resistor 242 can be connected between the terminals of the switch 238 in order to make possible the selection of different scales when the power output is read. A suitable dropping resistor 244 is connected between the selector switch 238 and ground.

Connected to the slide arm of the switch 238 is a squaring circuit 246 of a suitable known construction to provide a voltage proportional to the power output of the apparatus. An amplifier 248 is connected in series with the squaring circuit 246 and a voltage divider 250 is connected between the amplifier 248 and ground. The slide arm of the voltage divider 250 is connected through a conductor 252 to a resistance 254 and to a terminal 256. The power output of the sensor can be measured between the terminal 256 and a grounded terminal 258. To this end, any suitable measuring or recording instrument can be connected between the terminals 256 and 258.

Figure 5:
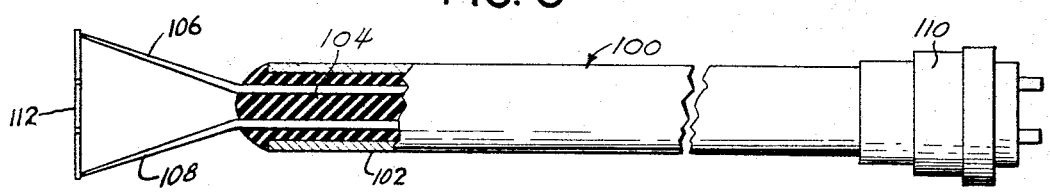
FIGURE 5 is a side elevational view partly in section of another embodiment of the invention.
Figure 6:
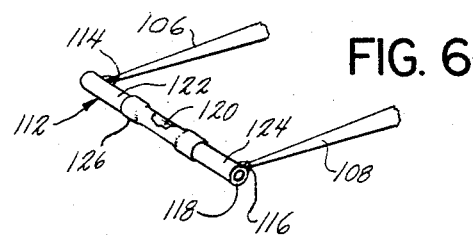
FIGURE 6 is an enlarged partial isometric view of the probe tip of FIGURE 5.

In another embodiment of the invention illustrated in FIGURES 5 and 6 there is provided a probe 100 including a casing 102 which can be formed from stainless steel or the like having a core material preferably of a suitable insulator such as resin or ceramic 104. Extending through the core material 104 and projecting out the ends thereof are a pair of support members such as tapered needles 106 and 108 which extend to the right through a supporting base 110 and are wired by suitable conductors (not shown) to a measuring and recording apparatus of the type whose circuit is shown in FIGURE 4.

Affixed between the ends of the needles 106 and 108 is a sensing element 112. The ends of the sensing element can be secured to the ends of the needles by suitable fastening means such as soldered connections 114 and 116. The sensing element 112 comprises a hollow glass tube 118 having an outside diameter of about 0.006 inch and an inside diameter of about 0.0048 inch. Throughout its entire length the tube 118 is covered with a thin layer of a conductive metal, such as platinum 120, as a resistance sensing element. As in the embodiment described hereinabove, the thickness of the platinum layer should be about 1000 angstroms. The ends of the sensing element 112 are covered with layers of gold 122 and 124 about 0.0005 inch in thickness. Overlapping the gold at the center section of the sensing element is a thin layer of an insulating material such as quartz 126 which is applied by sputtering as described hereinabove to a thickness of about 10,000 angstroms. The remainder of the sensing element and the supporting legs can then be insulated with an organic resin such as an epoxy resin, phenolic varnish or other insulating varnish or enamel, if required.

When the apparatus of the present invention is to be used in making water turbulence measurements, the probe is immersed in water and current is supplied to the bridge circuit. Readings are then taken which are directly related to the heat transfer between either the element 38 or element 120 as the case may be. These readings are then recorded either continuously or at predetermined intervals of time by suitable means, such as a strip chart recorder.

The substrate on which the resistance sensing element is mounted has been illustrated as a glass tube. For cooled sensors this is, of course, a requirement to provide a channel for the cooling fluid. For uncooled sensors, a solid rod may be used rather than a tube. However, a tube, particularly one with a thin wall, has an advantage in terms of minimum thermal mass. Keeping this mass to a minimum aids in the frequency response of the entire system. Since the center of a solid rod adds very little to its strength, the tube is an optimum configuration even when cooling is not required.

The device has been described generally as a fluid properties sensor, the actual measurement being heat transfer between the environment and the sensor. The cooled sensors are often used directly as heat flux transducers. In constant temperature streams they can be used as velocity sensors (anemometers) or, alternately, in constant velocity streams they can be used as temperature sensors. When both velocity and temperature vary, two sensors can be used operating at different surface temperatures to separate the two effects.

In low temperature fluids, the most common application of hot-film sensors is as a velocity measuring device (anemometer) in constant temperature environments. This is true for both gases and liquids. The hot-wire or hot-film anemometer is particularly useful for measuring turbulence levels under a wide range of conditions. In addition, accurate measurements of mean velocity, particularly at low levels, can be made.

Because of the high thermal conductivity of quartz, the temperature response time of the platinum layer under varying temperature conditions is reduced to some extent. In the present invention the quartz layer 53 is designed to operate under isothermal conditions and because the substrate or supporting means is held at a constant temperature, the specific heat of the quartz layer is relatively ineffective in changing the response time of the device. In this manner, the insulating effect of the layer 53 is minimized. If the apparatus were connected for variable temperature operation this effect could not be achieved.

The following mathematical relationships will help to explain this principle of operation. When the apparatus according to the invention is used in a liquid, such as water, the quartz layer was found a highly effective means for preventing the formation of bubbles upon the surface of the sensing element. The quartz layer also effectively reduces the chances of obtaining inaccurate readings through the deposition of mineral deposits on the sensing element.

As disclosed in my aforesaid copending application, the probe may be made according to any one of a variety of specific configurations, all having certain essential elements and relationships in common. The protective ceramic layer according to the present invention is applicable to each of these configurations. According to one embodiment the platinum layer may be applied in a discontinuous linear pattern separated by nonconductive spaces to provide a current flow path along the surface of the temperature sensitive area.

Figure 9:
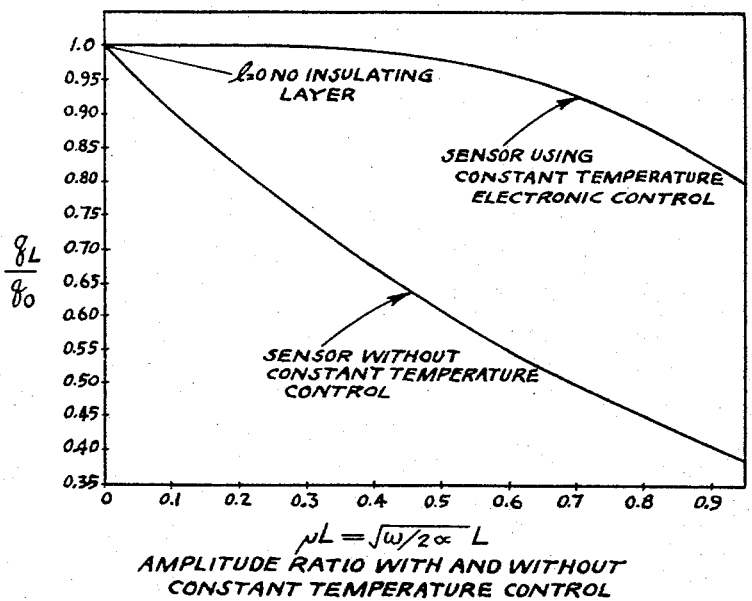
FIGURE 9 is a graph illustrating the amplitude ratio for constant temperature and homogeneous wall conditions.

Constant temperature control of the sensor is important primarily from the frequency response aspect. The equations set forth below give the basic relationships for heat transfer across a thin layer with two different boundary conditions at the surface $x=L$. The surface $x=L$ can also be considered as the location of the electrically conducting film while the surface at $x=0$ is exposed to the environment being measured. The two boundary conditions at $x=L$ correspond to the following as seen in FIGURE 9.

(1) $\theta$=constant: This is constant temperature control on the metallic film, the preferred procedure according to the present invention;

(2) Sensor without constant temperature control: In this case the resistance film is allowed to change temperature. The metallic conducting film can be thought of as slipped into a homogeneous material at a distance $x=L$ from the surface, with no control on the temperature the film assumes.

Since both the electrically conducting film and the insulating layer are very thin, the flat wall approximation also holds for cylindrical sensors where $L \ll d_0$ ($d_0$=sensor diameter).

Governing Equation:

$$\frac{\delta^2 \theta}{\delta x^2} - \frac{1}{\alpha}\frac{\delta \theta}{\delta t} = 0; \quad \alpha = \frac{k}{\rho c_p}$$

General Solution:

$$\theta = e^{i\omega\tau}(A e^{\lambda x} + B e^{-\lambda x})$$

*Specific solutions*

Boundary conditions

Case (1) $\quad \begin{array}{c} x=0 \\ q=q_0 \end{array} e^{i\omega\tau} \begin{array}{c} x=L \\ \theta=0 \end{array}$ (2) $\quad q=q_0 e^{i\omega\tau}$ Homogeneous material Solution for $\theta$ Case (1) $\quad \theta = (q_0/k\lambda)e^{i\omega\tau}\dfrac{e^{-\lambda(L-x)} - e^{\lambda(L-x)}}{e^{-\lambda L} + e^{\lambda L}}$ (2) $\quad \theta = -(q_0/k\lambda)e^{i\omega\tau}e^{-\lambda L}$ Solution for $q$ Case (1) $\quad q = q_0 e^{i\omega\tau}\dfrac{e^{-\lambda(L-x)} + e^{\lambda(L-x)}}{e^{-\lambda L} + e^{\lambda L}}$ (2) $\quad q = q_0 e^{i\omega\tau}e^{-\lambda x}$ FIGURE 9 depicts the results of the calculations indicated by the above equations. The ordinate is the ratio of heat flux a the surface at $x=0$ to the heat flux to the surface at $x=L$. When this ratio is one, the material between $x=0$ and $x=L$ has no influence on the response of the metallic film (at $x=L$) to changes in heat flux at $x=0$. The abscissa is a parameter which depends on the distance ($L$), frequency ($\omega$), and the thermal diffusivity ($\alpha$) of the material.

A calculation for a specific layer thickness and material can give some indication of the importance of the data given on FIGURE 9 if we let:

Material=quartz
$\quad \alpha=0.00834$ cm.$^2$/sec.
$\quad L=10^{-4}$ cm.
Frequency=30,000 cycles per second
$\quad \omega=189,000$ radians per second
then:
$\quad \mu L=0.336$
For constant temperature control ($\theta_e$=constant)

$$\frac{q_L}{q_0} = 0.996$$

For homogeneous material:

$$\frac{q_L}{q} = 0.715$$

Therefore, the error with the constant temperature back is only 0.4 percent while without constant temperature control it is 28.5 percent. This example shows the value of constant temperature operation when using an insulated sensor.

The general operation of the sensors is as described in detail in my copending application. The improvements attributable to the present invention will be more thoroughly understood by reference to the following examples:

*Example 1*

Figure 7:
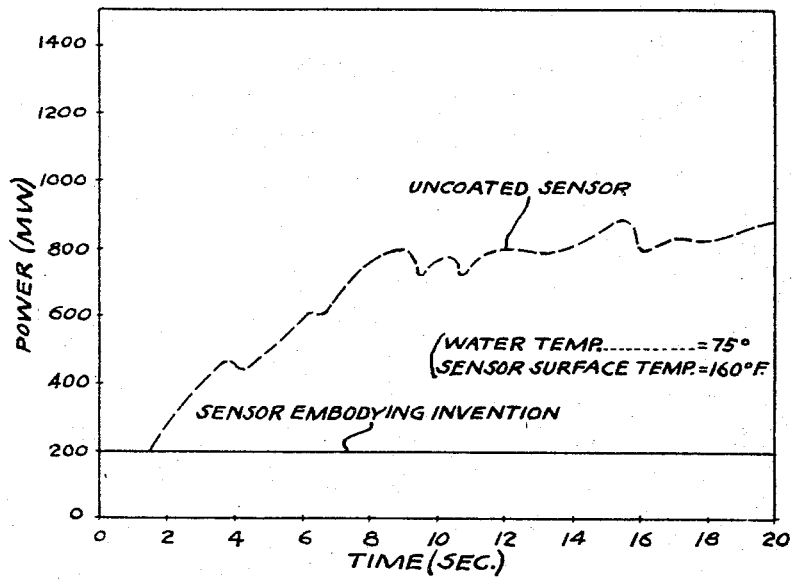
FIGURE 7 is a graph illustrating a temperature record obtained with the probe immersed in water.

FIGURE 7 shows the improvement obtained when using a coated sensor in water. The example shown is for still water in a beaker. The wavy broken line is obtained with an uncoated sensor and is thought to be the result of hydrolysis on the surface of the sensor. In any case, an observable feature is the formation of a bubble (or bubbles) of gas on the sensor. If the bubble is removed by shaking the probe, the power level will again drop to the 200 mw. level. However, within a second or two a new bubble will start forming.

With the quartz coating according to the present invention, no bubbles form and, therefore, in still water the power input to the sensor remains constant. Therefore, changes in power level occur only due to changes in environment temperature or velocity. This is the measurement desired. The formation of bubbles on the uncoated sensor can completely obliterate the desired information. The problem also occurs in flowing water, where the bubble of gas will usually attach to the downstream side of the sensor, causing a very large and often quite regular fluctuation in the output signal.

*Example 2*

Figure 8:
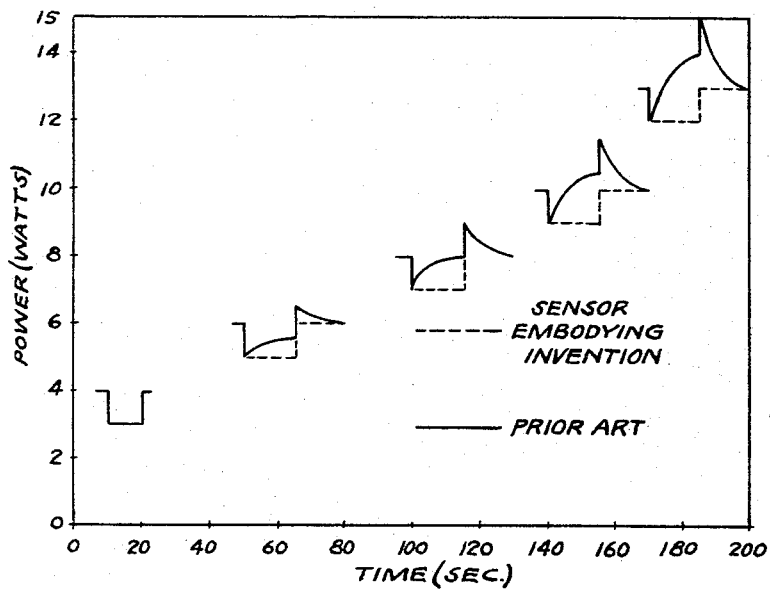
FIGURE 8 is a graph illustrating a temperature record obtained with the probe placed in a stream of heated gas.

FIGURE 8 shows the results obtained when alternately exposing the sensor to room temperature air and a propane-air flame at about 3150° F. At very low average power inputs to the sensor, both the coated and uncoated sensors give the same reading. As the power level is increased (increase in surface temperature of sensor), the uncoated sensor drifted to higher power levels when in the flame and then drifted back to its original power level after removal from the flame. It should be noted that when going from room temperature air to the flame, the power level goes down. This is because less electrical power is required to maintain the sensor surface temperature constant when more heat is being supplied by the environment. At power levels above 8 watts, the drift actually is greater than the initial change due to environment temperature change. This amounts to an inaccuracy in the reading of over one hundred per cent. Clearly, this is undesirable and makes measurements in combustors impossible to correctly interpret.

With the quartz coated sensors, the result is shown by the dotted line of FIGURE 8. This response is the correct one, the power level remaining constant while in the flame and returning promptly to the original level after removal from the flame. In this case the sensor can be relied on to give accurate data in environments generated by combustion gases.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A fluid properties sensing apparatus comprising in combination a probe body, said probe body having a sensor element thereon, said probe element including an electrically conductive sensing material, means conductively connected to the sensing material for supplying current thereto, a thin continuous homogeneous insulating coating of a nonconductive ceramic material applied over the surface of the conductive sensing element and a means conductively connected to the sensing material for maintaining the sensing material at constant temperature and measuring changes in current flow therethrough responsive to changes in the properties of said fluid to maintain the temperature constant.

2. A fluid properties sensing apparatus comprising in combination a probe, said probe having a sensor element thereon including an electrically conductive sensing member, means conductively connected to the sensing member for supplying current thereto, a thin continuous homogeneous insulating coating of a nonconductive ceramic material applied over the surface of the conductive sensing member and a means conductively connected to the sensor element for measuring changes in current flow therethrough, said control means including a bridge circuit, an amplifier connected to the bridge circuit for supplying current to the sensing element proportional to decreases in the resistance of said sensing member whereby the changes in heat loss due to changes in fluid properties at the sensing member is substantially compensated by said current supplied thereto by the amplifier.

3. A fluid properties sensing apparatus according to claim 2 further characterized in that said electrically conductive sensing element is a thin film of stable electrically conductive metal.

4. A fluid properties sensing apparatus according to claim 2 further characterized in that said electrically conductive sensing element is a thin film of platinum applied over a ceramic substrate and said continuous homogeneous coating of a nonconductive material is a thin film of quartz applied over the surface of the conductive sensing element and having substantially the same coefficient of thermal expansion as said substrate.

5. In a fluid properties sensing apparatus according to claim 2 further characterized in that said sensor element comprises a relatively elongated tubular support member having conductive means extending to within relatively closely spaced points on said support member, said sensing member is a thin coating of a conductive resistance sensing material applied to the support member between said points, a protective layer of a thin continuous homogeneous nonconductive insulating coating of a ceramic material is applied to the support member over said conductive resistance sensing material.

6. A fluid properties sensing apparatus according to claim 2 further characterized in that said sensor element is formed from a nonconductive temperature resistance ceramic material, said metallic sensing member is a thin conductive layer deposited upon the ceramic sensor element, said conductive layer being on the order of from 500 angstroms to 5000 angstroms in thickness, said means conductively connected to the sensing member including conductors connected to the conductive layer at points spaced at a predetermined distance, and said thin continuous layer of a homogeneous ceramic material enclosing said conductive sensing layer and extending at each end over said conductors, said ceramic material having a thickness of from 4000 to 20,000 angstroms.

7. A fluid properties sensing apparatus according to claim 2 further characterized in that said probe includes a body having a hollow interior, duct means are provided communicating through said probe body for supplying a cooling medium thereto, said sensor member extends outwardly from the probe body and has a duct means communicating therethrough for supplying a cooling medium to the interior thereof and for exhausting said cooling medium therefrom.

8. A system for the measurement of properties of fluids, said system including a self-balancing Wheatstone bridge circuit having as one resistance a temperature probe, said probe comprising a body including a temperature sensitive area for exposure to the fluid whose properties are to be measured and having a base composed of a material having high electrical resistivity and low thermal conductivity and a metallic electrically conductive surface coating thereon, a thin continuous homogeneous insulating layer of a nonconductive ceramic material applied upon the outside surface of the metallic electrically conductive surface coating and enclosing the same to prevent contact between said conductive coating and said fluids, conducting means within the probe body in electrical contact with said conductive surface coating, conductive leads connecting said conducting means into said circuit for application of electric current to said conductive surface coating for the resistance heating thereof to maintain the same at a predetermined constant temperature less than the temperature of the environment of the fluid whose properties are to be measured whereby heat may be transferred from the environment to the conductive surface coating, channel means within said probe body and extending immediately adjacent to said temperature sensitive area, said channel means adapted for connection to a source of cooling fluid for the circulation of cooling fluid through the probe body for the positive direct cooling of said body and positive direct cooling of said temperature sensitive area, and means for measuring the amount of current required to maintain the conductive surface coating at the predetermined constant temperature.

9. A probe according to claim 8 further characterized in that said probe body is generally hollow and tubular and is provided at one end adjacent the temperature sensitive area with a nose of substantial thickness formed from a highly heat conductive metal.

10. A probe according to claim 8 further characterized in that the base of said temperature sensitive area is composed of a ceramic material having high electrical resistivity and low thermal conductivity.

11. A probe according to claim 8 further characterized in that said electrically conductive surface coating is composed of a thin film of platinum plating of the order of about 500 to 5000 angstroms on said base.

12. A probe according to claim 8 further characterized in that said temperature sensitive area is tubular in form for passage of cooling fluid therethrough, said tubular temperature sensitive area extends outwardly from said probe body and said electrically conductive surface coating is disposed on the outside surface of said tubular extension.

13. A probe according to claim 12 further characterized in that said tubular temperature sensitive area extending out from said probe body is in the form of a closed loop for circulation of cooling fluid from said body through said tubular element and back to said probe body.

14. A probe according to claim 8 further characterized in that said electrically conductive surface coating is disposed on said base in a discontinuous linear pattern separated by electrically nonconductive spaces to provide a current flow path along the surface of said temperature sensitive area.

15. A probe according to claim 14 further characterized in that said conducting means are wires extending through said probe body and connected in electrical contact with the surface of said electrically conductive coating at remote points in said current flow path defined by the discontinuous pattern of the conductive coating.

16. A probe according to claim 12 further characterized in that one end of said tubular temperature sensitive area extending out from said probe body is in electrical contact with a metal electrically conductive tube extending through said probe body and electrically insulated therefrom and the other end of said tubular temperature sensitive areas is in direct electrically conductive contact with said probe body.

17. A probe according to claim 8 further characterized in that the channels within the probe body for circulation of cooling fluid include at least two parallel but spaced apart channels having communicating passage means adjacent said temperature sensitive area.

References Cited

UNITED STATES PATENTS

| | | | |
|---|---|---|---|
| 1,902,427 | 3/1933 | Sawyer | 73—204 |
| 2,450,263 | 9/1948 | Wise | 73—362 X |
| 2,870,305 | 1/1959 | Ling | 73—204 |
| 2,946,974 | 7/1960 | Sias | 73—362 X |
| 2,961,625 | 11/1960 | Sion | 73—362 X |
| 3,036,464 | 5/1962 | Beeston | 73—362 X |
| 3,138,025 | 6/1964 | Fingerson | 73—362 |

FOREIGN PATENTS 553,568　1/1957　Belgium.

OTHER REFERENCES

Lumley, J. L., "The Constant Temperature Hot-Thermistor Anemometer," in Symposium on Measurement in Unsteady Flow, pp. 75–82, May 23, 1962.

JAMES J. GILL, *Acting Primary Examiner.*

RICHARD C. QUEISSER, *Examiner.*

J. C. GOLDSTEIN, *Assistant Examiner.*